2,921,962

PROCESS OF PREPARING POLY-HYDROXY ARYLOPHENONES

Lester N. Stanley, Delmar, N.Y., assignor to General Aniline & Film Corporation, New York, N.Y., a corporation of Delaware No Drawing. Application June 20, 1958
Serial No. 743,478

7 Claims. (Cl. 260—591)

This invention relates to poly-hydroxy arylophenones and particularly to an improved process of preparing the same.

Poly-hydroxy benzophenones are usually prepared by one of several methods. One method consists of fusing fluorescein chloride with caustic soda at 270–280° C. The yields obtained are minutely small and hence this method was never adapted for commercial production. Another method consists of condensing 2,4-diacetoxybenzonitrile and resorcinol in the presence of hydrochloric acid and zinc chloride followed by hydrolysis in acid solution to yield a hydroxy benzophenone. The disadvantage of this method is the need to work with anhydrous ether which is not feasible under commercial conditions of manufacture. A commercially acceptable method consists in condensing resorcinol dimethyl ether with phosgene in the presence of aluminum chloride followed by demethylation as described in United States Patent 2,694,729. Demethylation of the condensed product is difficult to regulate, i.e., 2,2',4,4'-tetrahydroxybenzophenone is of low purity and the yield is exceedingly low ranging from 20 to 25% maximum. Despite the fact that this method has been used commercially, the low yield makes it unattractive for large scale commercial operation. Moreover, the price charged for the final product, because of the low yields obtained, is unusually high.

In order to overcome the problem of regulating demethylation, an attempt was made to condense β-resorcylic acid with resorcinol while employing aluminum chloride as a catalyst. The final product, i.e., 2,2',4,4'-tetrahydroxybenzophenone, contained considerable tar, and on isolation also contained a considerable amount of xanthone as an impurity and was unsuitable as an ultraviolet absorber. A further attempt was made by replacing the aluminum chloride by zinc chloride and phosphorus oxychloride as catalysts. The final reaction product sets up to a hard concrete-like mass which is impossible to stir and therefore very difficult to isolate by drowning from the reaction mixture without local overheating and resultant decomposition to xanthone and tarry by-products. Even though the latter modification may be workable in small laboratory quantities, it is not suitable for large scale commercial production.

This method was supplanted by the method described in my copending United States patent application, S.N. 661,013, filed May 23, 1957, now U.S. Patent No. 2,854,485. According to this method poly-hydroxy benzophenones are prepared in good yields and of a high degree of purity by condensing an o-hydroxy aryl carboxylic acid with a phenol in the presence of zinc chloride and phosphorus oxychloride as catalysts and in the presence of aqueous phosphoric acid as solvent. Contrary to the usual condensation reactions employing aluminum chloride, zinc chloride and the like as catalysts wherein the reactions normally require an anhydrous medium, I found that between 2–20% of water must be present for the reaction to run satisfactorily so as to give good yields of products of high degree of purity. If the medium is anhydrous, frequently the reaction mass becomes very viscous, sets up to a solid and is not workable.

I have now found that poly-hydroxy benzophenones can be readily prepared in consistently better yields and of higher degree of purity by condensing an o-hydroxy aryl carboxylic acid with a phenol in the presence of zinc chloride and phosphorus trichloride as catalysts and in the presence of a phosphoric acid which analyzes 100–106% $H_3PO_4$ as a solvent. This particular phosphoric acid which has an $H_3PO_4$ content of 100–106% is prepared by diluting commercial polyphosphoric acid with water or less concentrated phosphoric acid to an $H_3PO_4$ content of 100–106%. For ease of expression, the term polyphosphoric acid will be employed when phosphoric acid which analyzes 100–106% $H_3PO_4$ content is intended, and it is to be understood that thruout the remainder of this application, the term polyphosphoric acid means polyphosphoric acid which has been so diluted to an $H_3PO_4$ content of 100–106% with water or dilute phosphoric acid. The yields of the products obtained when using this method are consistently of approximately 78–85% of theory, whereas the yields of the products obtained when an o-hydroxy aryl carboxylic acid is condensed with a phenol in the presence of zinc chloride and phosphorus oxychloride as catalysts in the presence of aqueous phosphoric acid as a solvent, according to the method of my copending United States patent application S.N. 661,013, are consistently of approximately 68–75% of theory. This consistent improvement in yield is quite important economically in the commercial manufacture of an expensive product. Furthermore, the products obtained by this newly proposed process are consistently of better quality than the products produced by the method of S.N. 661,013, in particular, the shades are lighter and therefore, more preferable, especially in applications where they are to be incorporated in a transparent or colorless medium such as a plastic or lacquer film.

It is quite surprising that poly-hydroxy benzophenones can be produced in good quality and yield when an o-hydroxy aryl carboxylic acid is reacted with a phenol in the presence of zinc chloride and phosphorus trichloride and polyphosphoric acid, since when I tried to react β-resorcylic acid with resorcinol employing zinc chloride and phosphorus trichloride in place of phosphorus oxychloride as catalysts no reaction occurred. In the reaction of an o-hydroxy aryl carboxylic acid with a phenol in the presence of zinc chloride and phosphorus trichloride it is most unexpected that the addition of polyphosphoric acid allows the reaction to run efficiently when, in fact, no reaction occurs without the addition of the polyphosphoric acid.

Another feature is that phosphorus trichloride becomes an extremely active catalyst when used in this condensation system with zinc chloride and polyphosphoric acid. As a result, considerably less phosphorus trichloride is necessary in contrast to the amount of phosphorus oxychloride generally used in this type of reaction.

Furthermore, when contrasting the method wherein phosphorus oxychloride and zinc chloride are used as catalysts with the method wherein phosphorus trichloride and zinc chloride are used as catalysts, it is surprising to note that in the first case the optimum reaction occurred when water was present and the phosphoric acid content was between 85–98%, and that when 100% phosphoric acid was used the reaction frequently became unworkable, but in the latter case optimum reaction conditions occur when the phosphoric acid content is greater than 100%, i.e., 100–106%.

Accordingly, it is the principal object of the present invention to provide an improved method of preparing poly-hydroxyarylophenones in high yields and of high purity which are particularly useful as ultraviolet absorbing agents.

Further objects and advantages will become more clearly manifest from the following description. The parts given are by weight.

In practicing the invention, 1 part of an o-hydroxy aryl carboxylic acid, an approximately (molecular) equivalent of a phenol, 1-4 parts of zinc chloride, 3-15 parts of polyphosphoric acid which has a phosphoric acid ($H_3PO_4$) content of 100-106% and 0.3-5.0 parts of phosphorus trichloride are combined, heated slowly to and maintained at 45-75° C. for 3-24 hours. The charge is then drowned in an ice and water mixture, filtered and purified in the usual manner by solution, clarification and recrystallization. The proportions of the reactants, i.e., o-hydroxy aryl carboxylic acid and phenol, are not critical. In fact, a slight excess up to about 10% of either one may be used to give final products of high yields and of high degree of purity. Optimum results are obtained if the ratio of o-hydroxy aryl carboxylic acid to phosphorus trichloride is about 1 part of the former to about 1-2 parts of the latter, and 1 part of the o-hydroxy aryl carboxylic acid to 2-4 parts of zinc chloride.

Optimum results also depend on the temperature at which the reaction is run. At lower temperatures, the reaction time is longer but the quality of the product is somewhat better than if a higher temperature is used.

The usual method of carrying out the invention is to combine the o-hydroxyl aryl carboxylic acid, the phenol, the zinc chloride and the polyphosphoric acid at about room temperature, i.e., 25-30° C., warm to 45-75° C. slowly while gradually adding the phosphorus trichloride over a period of 1-4 hours and maintain the charge at 45-75° C. for 3-24 hours, followed by isolation and purification.

An alternative method which has been found to have some advantages consists in combining the o-hydroxy aryl carboxylic acid, the phenol, the zinc chloride, the polyphosphoric acid and the phosphorus trichloride at about room temperature, followed by a gradual heating to 45-75° C. at the rate of about 5° C. per hour, followed by maintenance of such temperature for 3-24 hours. The charge is then isolated and purified in the usual manner.

In carrying out this invention it has been found that the phosphoric acid content is quite critical. This is demonstrated in the following chart, which shows the yield of poly-hydroxyarylophenone in relation to the percentage of phosphoric acid in the polyphosphoric acid:

| Concentration of $H_3PO_4$ in polyphosphoric acid in percent | Yield of 2,2',4,4'-tetrahydroxybenzophenone in percent of theoretical |
|---|---|
| 94 | 19.5 |
| 97 | 27 |
| 98.6 | 30.8 |
| 100 | 60 |
| 101.1 | 63.2 |
| 103 | 78.6 |
| 103 | 82.6 |
| 103 | 85 |
| 104.4 | 55.6 |
| 106 | 51.1 |

These experiments were carried out as follows: 317 g. polyphosphoric acid of varying concentrations, 33.5 g. β-resorcylic acid, 25.2 g. resorcinol and 67 g. zinc chloride were charged together and heated to 55° C. 38 g. phosphorus trichloride was dropped in slowly over a period of 1½-3 hours while maintaining the temperature at about 55° C. Heating was continued at 55-60° C. for 10 hrs. The charge was drowned in several liters of ice and water, filtered and washed with cold 2½% aqueous sodium bicarbonate solution. After treatment with the sodium bicarbonate solution, the charge was dissolved in hot water made slightly acid with HCl, treated with Nuchar and a very small amount of zinc dust, filtered, cooled, crystallized, filtered, dried and weighed.

The various concentrations of polyphosphoric acids were obtained by diluting commercially available polyphosphoric acid to the desired concentration with water or more dilute phosphoric acid.

The chart clearly shows that at lower concentrations of phosphoric acid up to about 100%, the yields are very poor, then there is an optimum concentration at which consistently high yields are obtained, i.e., at about 103%, followed by a sharp decrease in yield.

The o-hydroxy aryl carboxylic acids are characterized by the following general formulae:

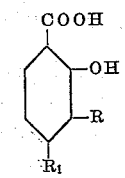

and

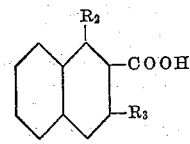

wherein R and $R_1$ represent either hydrogen, hydroxy, halogen, e.g., bromine, chlorine, etc., alkyl, e.g., methyl, ethyl, propyl, butyl, etc., or alkoxy, e.g., methoxy, ethoxy, propoxy, isopropoxy, butoxy, etc., $R_2$ represents either hydrogen or hydroxy and $R_3$ represents either hydrogen of hydroxy. When either group $R_2$ or $R_3$ is hydroxy the other is hydrogen.

As illustrative examples of o-hydroxy aryl carboxylic acids which are condensed with a phenol, the following may be mentioned:

| | |
|---|---|
| Salicylic acid | 4-ethoxysalicylic acid |
| 3-methylsalicylic acid | 4-methylsalicylic acid |
| 3-chlorosalicylic acid | 4-chlorosalicylic acid |
| 3-methoxysalicylic acid | 2,3,4-trihydroxybenzoic acid |
| 2,4-dihydroxybenzoic acid | 1-hydroxy-2-naphthoic acid |
| 4-methoxysalicylic acid | 3-hydroxy-2-naphthoic acid |

It is to be noted that a large class of o-hydroxy aryl carboxylic acids may be employed.

The phenols are characterized by the following general formula:

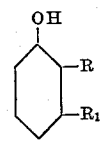

wherein R and $R_1$ have the same values as above.

As examples of phenols which may be employed, the following are illustrative:

| | |
|---|---|
| Phenol | o-Chlorophenol |
| Resorcinol | Catechol |
| Resorcinol monomethyl ether | Guaiacol |
| Resorcinol monoethyl ether | m-Chlorophenol |
| m-Cresol | Pyrrogallol |
| o-Cresol | |

The improved process will be more fully described in conjunction with the following examples. It is to be noted, however, that these examples are merely illustrative of the invention and are not to be limited by the details set forth therein.

*Example I*

Into a flask was charged 317 grams of a mixture analyzing 103% $H_3PO_4$ prepared by mixing 190 grams of commercial polyphosphoric acid and 127 grams of 85% phosphoric acid. To this was added, with constant stirring to a uniform slurry, at 25–30° C. 33 grams of β-resorcylic acid, 29.5 grams of resorcinol and 67 grams of zinc chloride. This slurry was heated to 60° C. in 1 hour. 38 grams of phosphorus trichloride was added in 1½ hours. After the phosphorus trichloride was added, the charge was held at 60° C. for 8½ hours. It was then drowned in several liters of ice and water, filtered and washed with cold 5% aqueous sodium bicarbonate solution. After treatment with the sodium bicarbonate solution, the charge was dissolved in hot water made slightly acid with HCl, treated with Nuchar and a very small amount of zinc dust, filtered, cooled, crystallized and filtered. 45 grams of 2,2′,4,4′-tetrahydroxybenzophenone, M.P. 200–201° C., was obtained. This corresponds to a yield of 85% of theory.

Example II 317 grams of polyphosphoric (103% $H_3PO_4$ content), 33.5 grams of β-resorcylic acid, 25.2 grams of resorcinol and 67.0 grams of zinc chloride were stirred together at room temperature, i.e., 27° C., until a uniform slurry was formed. Over a 2-hour period wherein the temperature rose from the initial 27° C. to 37° C., 38 grams of phosphorus trichloride was added. The temperature was then increased at the rate of about 5° per hour for 4 hours, until about 60° C. was attained. The charge was maintained at 60° C. for 16 hours, after which it was drowned in several liters of ice and water, filtered, and washed with cold 5% aqueous sodium bicarbonate solution. After treatment with the sodium bicarbonate solution, the charge was dissolved in hot water made slightly acid with HCl, treated with Nuchar and a very small amount of zinc dust, filtered, cooled, crystallized and filtered. The yield was 42 grams (78.6% of theory) of very light yellow crystals of 2,2′,4,4′-tetrahydroxybenzophenone.

Example III

Example II was repeated with the exception that the temperature was raised to 50° C. instead of 60° C. It was held at 50° C. for 24 hours and then finished as in Example II. A yield of 43.8 grams of 2,2′,4,4′-tetrahydroxybenzophenone was obtained, which corresponds to a yield of 82% of the theoretical.

Example IV

Example II was repeated with the exception that the 33.5 grams of β-resorcylic acid was replaced by 30 grams of salicylic acid. After treatment with sodium bicarbonate solution, as in Example II, the charge was dissolved in hot isopropanol, treated with Nuchar with a very small amount of zinc dust, filtered, cooled, crystallized and filtered. Pale yellow crystals of 2,2′,4-trihydroxybenzophenone were obtained.

Example V

Example II was repeated with the exception that the 33.5 grams of β-resorcylic acid were replaced by 32.2 grams of 4-methylsalicylic acid. The final recrystallization was made from hot isopropanol in place of acidified water. Pale yellow crystals of 2,2′,4-trihydroxy-4-methylbenzophenone were obtained.

Example VI

Example II was repeated with the exception that the 33.5 grams of β-resorcylic acid was replaced by 37.6 grams of 4-chlorosalicylic acid. The final recrystallization was made from hot isopropanol in place of acidified water. Pale yellow crystals of 4-chloro-2,2′,4′-trihydroxybenzophenone were obtained.

Example VII

Example II was again repeated with the exception that the 25.2 grams of resorcinol were replaced by 21.6 grams of phenol. The final recrystallization was made from hot isopropanol in place of acidified water. Crystals of 2,4,4′-trihydroxybenzophenone were obtained.

Example VIII

Example II was again repeated with the exception that the 25.2 grams of resorcinol were replaced by 28.3 grams of resorcinol monomethyl ether. The final recrystallization was made from hot isopropanol in place of acidified water. Yellow crystals of 2,2′,4-trihydroxy-4′-methoxybenzophenone were obtained.

Example IX

Example II was again repeated with the exception that the 25.2 grams of resorcinol were replaced by 28.4 grams of pyrogallol. Yellow crystals of 2,2′,3,4,4′-pentahydroxybenzophenone were obtained. Since this product is water-soluble, it may be recrystallized from water.

Example X

Example II was again repeated with the exception that the 33.5 grams of β-resorcylic acid were replaced by 41 grams of 1-hydroxy-2-naphthoic acid. The final recrystallization was made from hot isopropanol in place of acidified water. Yellow crystals of 1,2′,4′-trihydroxynaphthophenone were obtained.

Example XI

Example II was again repeated with the exception that the 33.5 grams of β-resorcylic acid were replaced by 37 grams of 2,3,4-trihydroxybenzoic acid. Yellow crystals of 2,2′,3,4,4′-pentahydroxybenzophenone were obtained.

I claim:
1. The process of preparing poly-hydroxy arylophenones which comprises condensing an o-hydroxy aryl carboxylic acid with a phenol in the presence of a mixture of phosphorus trichloride and zinc chloride as a catalyst and in the presence of phosphoric acid which has a phosphoric acid content of 100–106% as a solvent, and at a temperature ranging from 45–75° C., and isolating and purifying the said phenone.
2. The process of preparing poly-hydroxy arylophenones which comprises condensing at a temperature of 45–75° C. 1 part by weight of an o-hydroxy aryl carboxylic acid with an approximately molecular equivalent weight of a phenol in the presence of a catalyst mixture consisting of 0.3–5.0 parts by weight of phosphorus trichloride and 1–4 parts by weight of zinc chloride, in the presence of 3–15 parts by weight of phosphoric acid as a solvent which has a phosphoric acid content of 100–106%, and isolating and purifying the said phenone.
3. The process according to claim 1 wherein the said o-hydroxy aryl carboxylic acid is β-resorcylic acid.
4. The process according to claim 1 wherein the said o-hydroxy aryl carboxylic acid is 4-methyl salicylic acid.
5. The process according to claim 1 wherein the said o-hydroxy aryl carboxylic acid is 4-chlorosalicylic acid.
6. The process according to claim 1 wherein the said o-hydroxy aryl carboxylic acid is salicylic acid.
7. The process according to claim 1 wherein the said o-hydroxy aryl carboxylic acid is 2,3,4-trihydroxybenzoic acid.

References Cited in the file of this patent
UNITED STATES PATENTS

| | | |
|---|---|---|
| 415,088 | Bohn | Nov. 12, 1889 |
| 2,386,007 | Schmerling et al. | Oct. 2, 1945 |

OTHER REFERENCES

Snyder et al.: J. Am. Chem. Soc., vol. 77, pp. 364–5 (1955).